No. 796,215. PATENTED AUG. 1, 1905.
C. F. INGOLD.
EYEGLASSES.
APPLICATION FILED APR. 1, 1905.
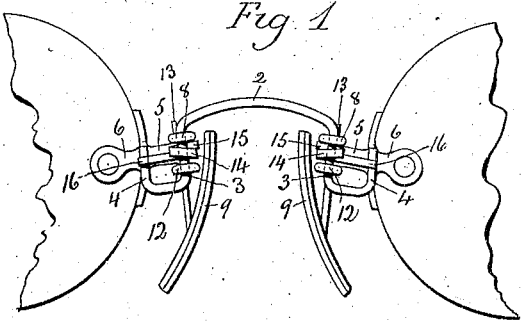
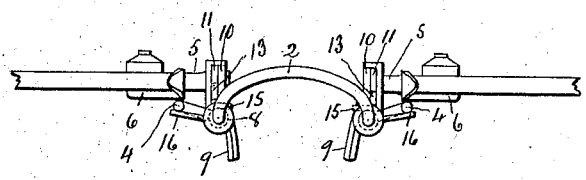
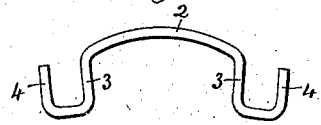
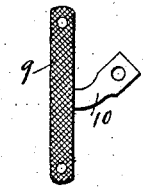
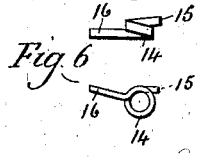
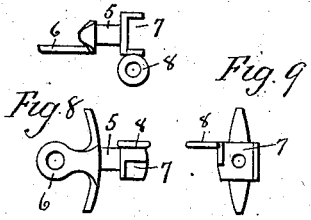
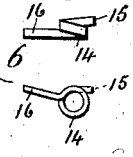
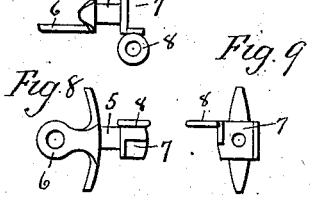
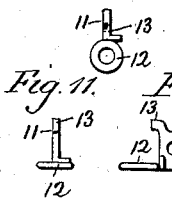
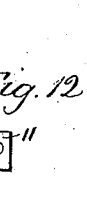
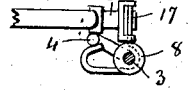

UNITED STATES PATENT OFFICE.

CARL F. INGOLD, OF NEW HAVEN, CONNECTICUT.

EYEGLASSES.

No. 796,215.  Specification of Letters Patent.  Patented Aug. 1, 1905.

Application filed April 1, 1905. Serial No. 253,302.

*To all whom it may concern:*

Be it known that I, CARL F. INGOLD, a citizen of the United States, residing at New Haven, in the county of New Haven and State of Connecticut, have invented a new and useful Improvement in Eyeglasses; and I do hereby declare the following, when taken in connection with the accompanying drawings and the numerals of reference marked thereon, to be a full, clear, and exact description of the same, and which said drawings constitute part of this specification, and represent, in—

Figure 1, a rear view of a pair of eyeglasses constructed in accordance with my invention with the lenses broken away; Fig. 2, a top or plan view of the same; Fig. 3, a front view of the bridge detached; Fig. 4, a side view of the guard detached; Fig. 5, a side view of the spring detached; Fig. 6, a top view of the same; Fig. 7, a top view of the post detached; Fig. 8, a side view of the same; Fig. 9, an edge view of the same; Fig. 10, a top view of the plate detached; Fig. 11, an edge view of the same; Fig. 12, a side view of the same; Fig. 13, a broken top view illustrating the modified form of spring.

This invention relates to an improvement in eyeglasses, and particularly to such as have a rigid bridge combined with springs whereby the lenses and nose-guards carried thereby may be yielding in contradistinction to glasses in which the spring is obtained from the flexibility of the bridge, the object of the invention being a simple arrangement of parts whereby this result is accomplished; and the invention consists in the construction as hereinafter described, and particularly recited in the claims.

In carrying out my invention I employ a bridge 2, which is formed from wire quite stiff, so that it will not readily bend. This wire is transversely bowed and its ends turned downward, forming stems 3, thence outward and slightly forward and thence upward, forming points 4, substantially parallel with the stems 3, or, in other words, forming a U-shaped bend at each end of the bridge. The post 5 is connected with a perforated arm 6, by which it is attached to the lens in the usual manner or to the rim surrounding the lens, also a common form of eyeglass structure. This post at its outer end has a groove or channel 7 and a transversely-arranged eye 8, which is adapted to pass over the points 4 and onto the stems 3. The nose-guards 9 have the usual perforated arms 10, which are connected with the posts 5 in the grooves 7, while located between the end of the arm 10 and the post 5 and also within the groove 7 is a perforated plate 11, having an eye 12 at its lower edge and a stop-lug 13 at its upper edge. Around the stems 3 and between the eyes 8 and 12 is a coiled spring 14, one end 15 of which bears against one side of the groove 7, while the other end 16 bears against the points 4, the tendency of the spring being to throw the lenses inward.

The parts are assembled by first placing the eyes 8 of the posts 5 over the points 4 and onto the stems 3 and then placing the springs 14 upon the stems, then passing the eyes 12 of the plates 11 over the points 4 onto the stem 3 and entering the plate in the grooves 7. The nose-guards 9 are then applied by placing the arms 10 in the grooves 7 and securing them by the usual screws, thus uniting the plate 11 with the post, and so that the eyes 8 and 12 are in line with each other, and the lug 13 extending above the posts and into the path of the bowed central portion of the bridge near the stems, and so that the movement of the posts upon the stem is limited, as the lug will strike the ends of the bridge and will thus be stopped against further movement than is necessary to adjust the glasses in position. The short end of the spring engages with the side of the groove 7 and the long end with the points 4. When thus arranged, the lenses may be turned on the stems 3, so as to separate the nose-guards and permit the glasses to be placed upon the nose. Then when the lenses are released the spring will cause the guards to grasp the nose.

To get proper adjustment, the bridge 2 may be bent, but when once adjusted will not need further attention, as the spring utilized to hold the guards in position is the coiled spring, and consequently will not become distorted or set, as is liable to be the case when the bridge itself is the spring. With this construction a comparatively small-sized wire may be employed for the bridge, and hence a very light structure obtained and one which is not liable to be bent or distorted.

Instead of employing a coiled spring, as above described, a longitudinally-bowed spring may be employed, as shown in Fig. 13, one end of the spring 17 being connected to the post inside or outside the arm of the nose-guard and extending rearward around the stem 3 between the eyes 8 and 12, and thence to one side where its end is turned to a bearing against the points 4, the tendency of the spring being to throw the lenses inward and the nose-guards toward each other.

My improved construction permits of the use of any form of nose-guard, or, at least, nose-guards which are usually employed in eyeglasses, and the points of the bridge may be bent to permit of more or less movement of the nose-guards and the lenses connected therewith.

Having fully described my invention, what I claim as new, and desire to secure by Letters Patent, is—

1. The herein-described eyeglasses consisting of lenses, posts secured thereto and each formed with an eye, a bridge formed from a single piece of metal and comprising a central portion, stems and points forming U-shaped ends, plates connected with said posts and formed with eyes through which said stems extend, springs arranged to bear upon the said points, and nose-guards secured to said posts, substantially as described.

2. The herein-described eyeglasses consisting of lenses, posts secured thereto and each formed with a horizontal eye, a bridge formed from a single piece of metal and comprising a central portion, stems and points forming U-shaped ends, plates connected with said posts and formed with eyes parallel with the eyes on the posts and through which eyes the stems extend, springs arranged on said stems between said eyes, and nose-guards secured to said posts, substantially as described.

3. The herein-described eyeglasses consisting of lenses, posts secured thereto and each formed with an eye, a bridge formed from a single piece of metal and comprising a central portion, stems and points forming U-shaped ends, plates connected with said posts and formed with eyes through which said stems extend, springs arranged on said stems between said eyes, and nose-guards secured to said posts, said plates formed at their upper edges with a stop-lug, substantially as described.

In testimony whereof I have signed this specification in the presence of two subscribing witnesses.

CARL F. INGOLD.

Witnesses:
FREDERIC C. EARLE,
CLARA L. WEED.